July 3, 1923.
J. E. MALKIN
STONE SUSPENSION DEVICE
Filed April 26, 1922    2 Sheets-Sheet 1
1,460,388
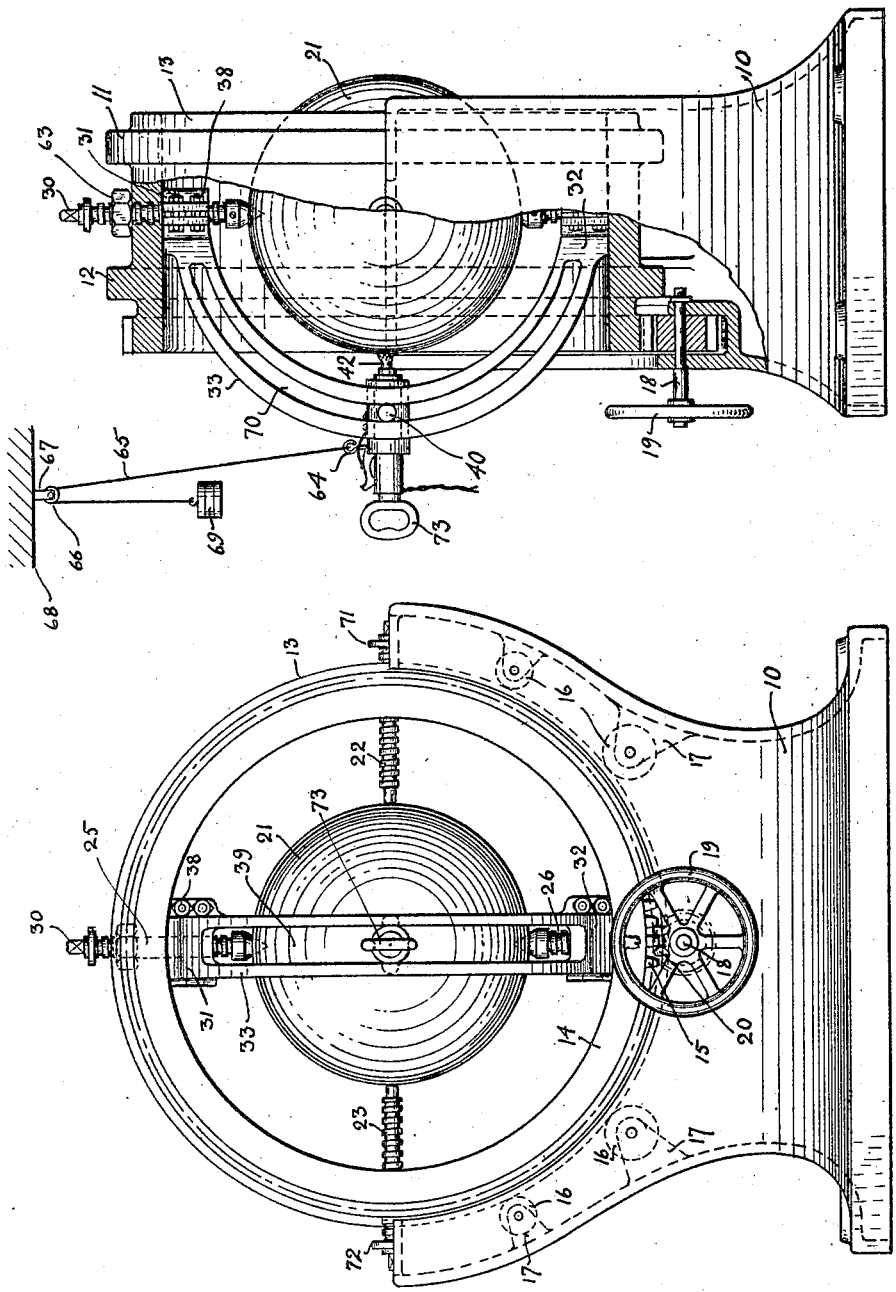
INVENTOR.
John E. Malkin
BY
George C. Heimer
ATTORNEY

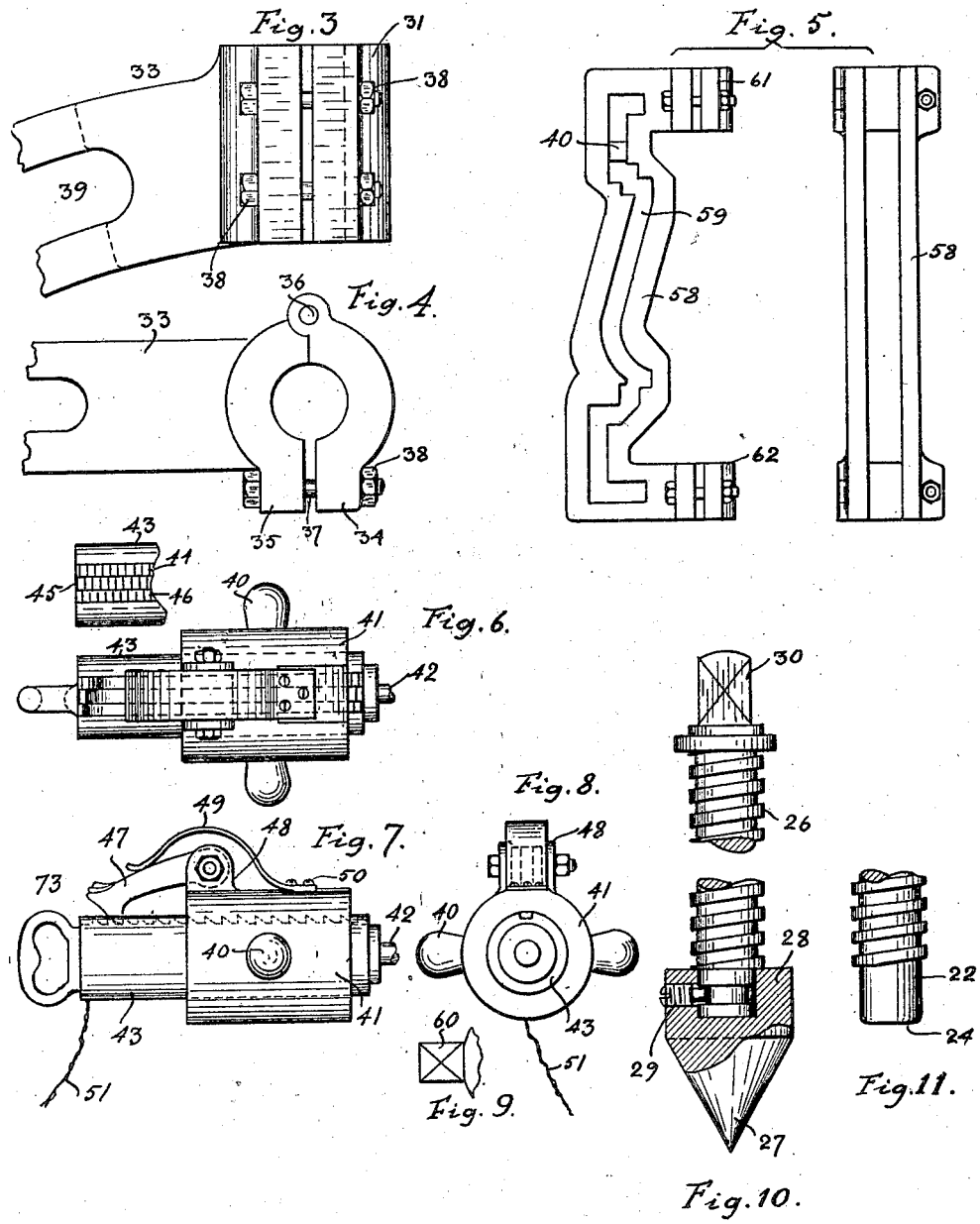

Patented July 3, 1923.

1,460,388

UNITED STATES PATENT OFFICE.

JOHN E. MALKIN, OF NEW YORK, N. Y.

STONE-SUSPENSION DEVICE.

Application filed April 26, 1922. Serial No. 556,664.

*To all whom it may concern:*

Be it known that I, JOHN E. MALKIN, a citizen of Russia, residing at New York, county of New York, and State of New York, have invented certain new and useful Improvements in Stone-Suspension Devices, of which the following is a specification.

The invention relates to improvements in stone working machines, preferably to a machine designed for finishing or profiling the top surfaces of monumental or building stones, and for other similar purposes.

It is the principal object of the invention to provide a machine of this character which is equally well adapted to work stones having a spherical or an irregular contour.

Another object of the invention is the provision of a machine of this character embodying means for supporting the stone to be operated on in a novel manner, so that it can readily be adjusted for all purposes.

A further object of the invention is the provision of a machine of this character permitting the ready adjustment and exchange of the stone working tools.

A still further object of the invention is the provision of a machine of this character which allows a simultaneous movement of tool and work holders into a convenient position directly in front of the operator, and for allowing an operation of the tools by electricity.

The invention furthermore includes the provision of suitable pattern and holders for the cutting tools to suit the pattern and special purpose for which the pattern is to be utilized.

Other objects and advantages of my invention will become more fully evident as the description thereof proceeds, and will then be more specifically pointed out in the appended claims.

A preferred form of my invention is illustrated in the accompanying drawings, forming a material part of my invention, in which:

Figure 1 is a front view of a machine constructed according to my invention.

Figure 2 is a side view thereof, partly in section.

Figure 3 is a fragmentary side view of a tool holder for tools to work on spherical and similar bodies.

Figure 4 is a top plan view thereof.

Figure 5 is a side and end view of a pattern and tool holder for work on bodies having an irregular contour.

Figure 6 is a top plan view of a hammer tool also showing a fragmentary part of the shaft.

Figure 7 is a side view of the hammer tool, and

Figure 8 is an end view thereof.

Figure 9 is a detail view of a tool head.

Figure 10 is a detail view of a work holder.

Figure 11 is a fragmentary detail view of another form of work holder.

The machine comprises a bed 10, the upper spaced ends of which are semicircularly shaped and grooved to form guides for the outer circular flanges 11 and 12 of a drum 13, which is open on both sides, and has a depending front flange 14 provided with teeth 15. In the space between the guide elements the outer wall of the drum 13 rests on rollers 16 rotating in brackets 17 secured to the inner wall of the bed 10.

A shaft 18 is transversely mounted in the bed 10 and carries at its outer end an operating hand wheel 19, and near the front face of the drum a gear 20 the teeth of which are in mesh with the teeth 15 of flange 14 allowing a rotation of the drum by the operation of the hand wheel.

The object to be worked upon is represented in the drawings by a spherical body 21 kept in place by lateral screws 22 and 23 passing through the drum on opposite sides thereof having blunt ends 24, and by screws 25 and 26 passed through the drum from above and below and provided at their inner ends with sharp points 27 on heads 28 which are kept in position on the screws by means of lateral adjusting screws 29, so that they may be exchanged for sharpening and for new points. The upper ends of the screws are provided with flat heads 30 for engagement by a suitable tool, and intermediate their ends these screws are passed through the drum and the heads 31 and 32 at the upper and lower ends of a suitable tool holder 33 which, as shown in Figure 4, comprises two clamping members 34 and 35 pivotally connected at their rear ends as at 36 and connected at their front ends by bolts 37 carrying nuts 38 at their outer ends.

The tool holder 33 has a longitudinal slot 39, and consists of two pairs of superposed parallel, curved members to both sides of the slot 39 between which the lateral guide pins 40 of a guide sleeve 41 for a hammer tool 42 are guided. Within the sleeve 41 the shaft 43 of the hammer is held, provided on its upper face with three juxtaposed racks 44, 45, 46 for engagement by pawls 47 pivoted at their inner ends between ears 48 on sleeve 41. A strong flat spring 49 is secured at one of its ends to the upper face of the body 41 as at 50, while its free end is pressing upon the upper edge of the pawls so that an extremely fine adjustment of the hammer tool is possible in the well known manner.

The hammer can be operated by means of electricity supplied by means of wires 51 in the ordinary well known manner.

In Figure 5 a modified form of a tool holder is illustrated comprising a body or pattern 58 provided with a slot 59 having the shape of the contour to which a stone is to be cut. The cutting tool in this instance having square guide pins 60, and the tool holder is provided with heads 61 and 62, similar to head 31 and 32 by means of which it is secured to the drum through the intermediary of screws similar to screws 25 and 26, while an adjustment of these screws is possible by means of the nuts 63. To the sleeve 41 for the hammer tool a hook 64 is secured to which one end of a cable 65 is attached, the other end of which is guided over a roller 66 in a hanger 67 attached to a ceiling or beam 68. The free end of this cable carries a weight 69, and this arrangement allows a convenient movement of the working tool along the stone to be worked upon with the pins 40 sliding in the spaces 70 between each pair of superposed curved member of the tool holder.

The screws 22 and 23 are extended through the drum and carry at their outer ends adjusting nuts or heads 71 and 72, while the ends of the screws can freely move between the spaced walls of the bed. The tool is provided with an outer hand lever or grip 73.

It will be clear that in operation, the stone body to be worked upon is secured in place within the drum by a suitable adjustment of screws 25 and 26 and 22 and 23, the former by means of their nuts 63.

The hammer 42 is adjusted accordingly, and if for instance the work on the lower part of the stone is finished, the drum is rotated by means of the hand wheel 19 to bring the upper part of the stone within convenient reach of the operator. The arrangement of the tool holder is such that it allows a free movement of the tool between the two pairs of curved segments, while the weight 69 will prevent a too rapid movement.

The tool holder is shown here to illustrate a support for a hammer for rigidly working on the surface of a spherical body, while it can be quickly exchanged by opening the clamps 34 and 35 after unlocking nuts 38, and if a pattern is to be used for guiding the working tool a holder as for instance illustrated in Figure 5 is placed on the drum, and in such a case the tool is provided with square pins.

Changes may be made in the general arrangement of my device, and in the construction of the minor details thereof without departing from the scope and spirit thereof.

What I claim as new and desire to protect by a United States patent is—

1. A machine of the character described, comprising a rotatable drum open on its sides, a tool holder attached to said drum, means for rotating said drum, means for holding a tool in said holder, means for holding a work piece in said drum in position in front of the tool on said holder, and means for suspending the tool holder.

2. A machine of the character described, comprising a rotatable drum, open on its sides, a bi-partite base, rollers secured on said base for guiding said drum, means for rotating said drum, a tool holder, means for holding a work piece in said drum in front of said tool, and a cable and weight for suspending the tool held in said holder for free oscillatory motion.

3. In a machine of the class described, a tool holder comprising two pairs of parallel superposed spaced and curved bars, a work piece holder, heads connecting the free ends of both pairs of bars, said heads forming clamps for holding adjusting screws forming part of the work piece holder, means for guiding the tool between each pair of curved bars, and means for allowing an adjustment of the tool against the work piece.

4. In a machine of the class described, a drum, a tool holder exchangeably attached to said drum, said tool holder constituting a pattern for the shaping of the stone, holding and adjusting screws for said tool holder, and clamps on said tool holder for clamping said screws between the cheeks of said clamps, adjustable work piece holding means for suspending the work piece in said drum, and means for rotating said drum and work piece into convenient working position.

5. In a machine of the class described, a tool holder comprising two pairs of curved guides, a shaft, a handle on said shaft, a pair of spaced lugs on said shaft for guiding it between the pairs of curved guides, and a clamping head for the tool laterally disposed to said holder.

In testimony whereof I have affixed my signature.

JOHN E. MALKIN.